Figure 1:
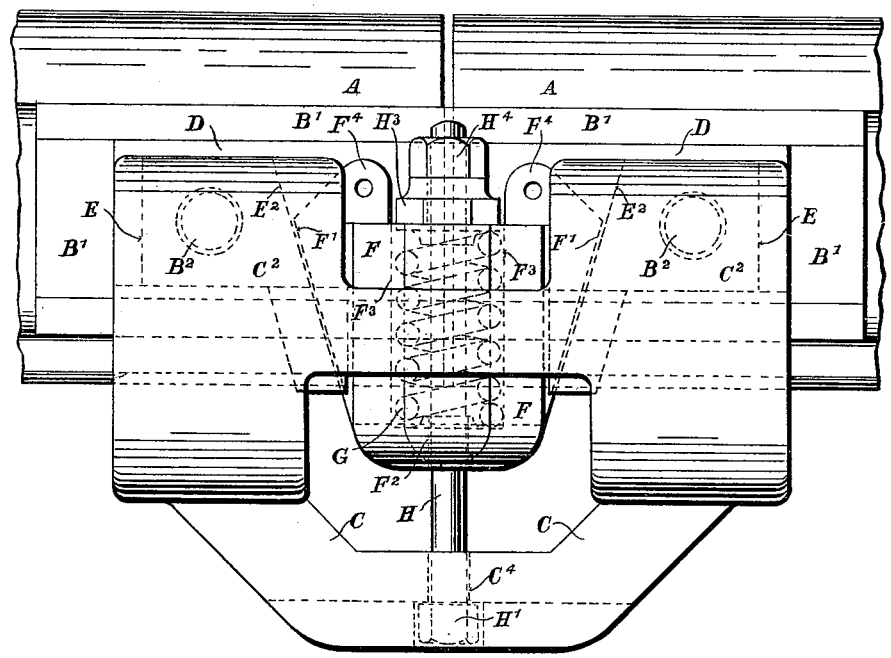

No. 623,932. Patented Apr. 25, 1899.
R. A. WHITE.
RAIL FASTENING.
(Application filed Sept. 17, 1898.)
(No Model.) 5 Sheets—Sheet 1.

Witnesses:
C. Holloway
M. C. Pinckney

Inventor:
Robert A. White,
By J. E. M. Bowen
Attorney.

THE NORRIS PETERS CO., PHOTO-LITHO., WASHINGTON, D. C.

No. 623,932. Patented Apr. 25, 1899.
R. A. WHITE.
RAIL FASTENING.
(Application filed Sept. 17, 1898.)
(No Model.) 5 Sheets—Sheet 2.

Witnesses:
C. Holloway
M. C. Pinckney

Inventor:
Robert A. White,
By J. E. M. Bowen
Attorney

No. 623,932. Patented Apr. 25, 1899.
R. A. WHITE.
RAIL FASTENING.
(Application filed Sept. 17, 1898.)
(No Model.) 5 Sheets—Sheet 3.
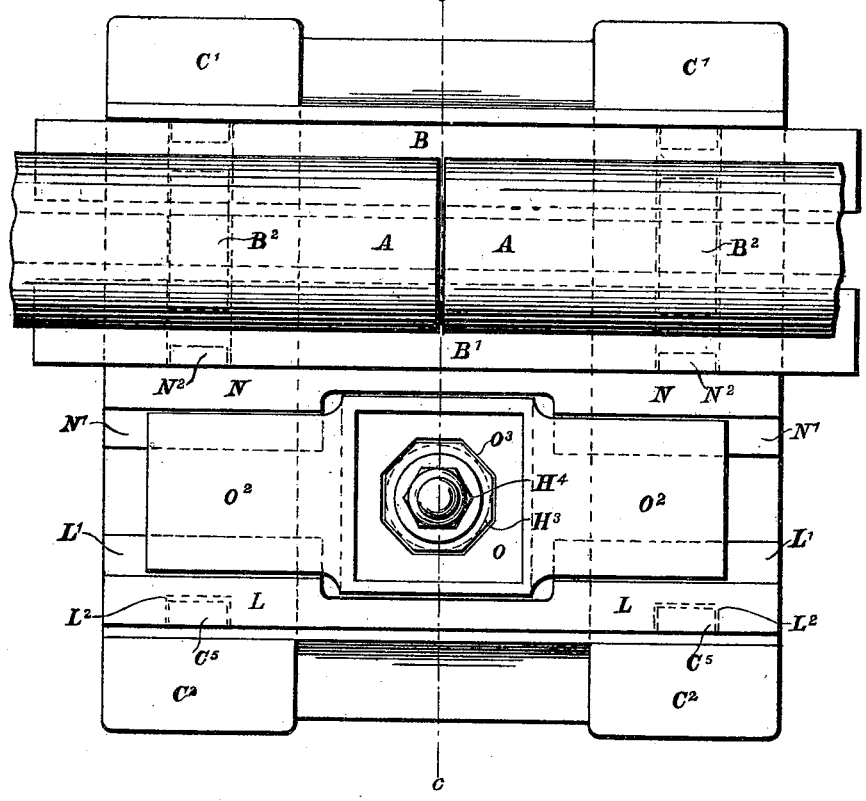
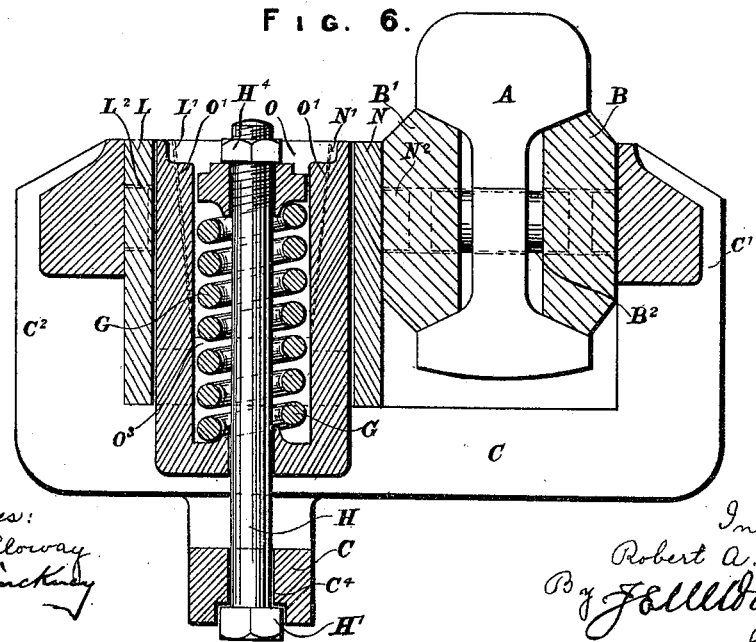
Witnesses:
C. Holloway
Wm. C. Pinckney
Inventor:
Robert A. White,
By J. Ellldoveu,
Attorney No. 623,932. Patented Apr. 25, 1899.
R. A. WHITE.
RAIL FASTENING.
(Application filed Sept. 17, 1898.)
(No Model.) 5 Sheets—Sheet 4.

Witnesses:
E. Holloway
M. C. Pinckney

Inventor:
Robert A. White,
By [signature]
Attorney

No. 623,932. Patented Apr. 25, 1899.
R. A. WHITE.
RAIL FASTENING.
(Application filed Sept. 17, 1898.)
(No Model.) 5 Sheets—Sheet 5.

Witnesses:
C. Holloway
W. C. Pinckney

Inventor:
Robert A. White,
By J. E. Bowen
Attorney

United States Patent Office.

ROBERT ARCHIBALD WHITE, OF ADELAIDE, SOUTH AUSTRALIA, ASSIGNOR TO THE "WHITE" PATENT RAIL FASTENING COMPANY, LIMITED, OF SAME PLACE.

RAIL-FASTENING.

SPECIFICATION forming part of Letters Patent No. 623,932, dated April 25, 1899.

Application filed September 17, 1898. Serial No. 691,142. (No model.)

*To all whom it may concern:*

Be it known that I, ROBERT ARCHIBALD WHITE, civil and mechanical engineer, a subject of the Queen of Great Britain, residing at Currie street, Adelaide, in the Province of South Australia, have invented certain new and useful Improvements in Rail-Fastenings, of which the following is a specification.

The object of this invention is to provide an inflexible fastening for the rails of railways and tramways which is also at the same time automatically self-tightening.

In the following specification the invention is shown more particularly as applied to the fastening of the joints of rails; but with some modifications of mechanical details the same principles may be applied to the chair or other device by means of which the rail is fixed upon the sleepers.

This invention consists of a special device or arrangement of parts whereby the tension of a compressed spring or its equivalent operating a movable wedge or wedges traveling along stationary inclined planes maintains the fish-plates in close contact with the rails. The wedge or wedges with their wedge-plates having relative inclined planes may be arranged either horizontally with an inward or outward travel or vertically with an upward or downward movement of the wedge or wedges, as may be preferred. The wedge or wedges are actuated, preferably, by a compressed helical spring; but any other suitable means may be employed which will drive them apart or draw them together, as the case may be, for the purpose indicated. When arranged horizontally, the wedges are operated by a vertical wedge-shaped block device having a central recess in which the helical spring is compressed by means of a bolt and nut provided for the purpose. This recess is made octagonal or some suitable shape, whereby a washer of similar shape, by means of which the spring is compressed under the action of a screw-nut, is prevented from rotating as the pressure is applied.

By means of this invention the tension of the spring upon the wedge-shaped block device operating through the wedges and wedge-plates, hereinafter described, automatically takes up any looseness of the fish-plates caused by wear or by the expansion and contraction of the rails. A special device for locking the screw-nut may also be provided, so that the pressure of the spring cannot be diminished or the nut turned upon the bolt without removing the locking device, but which locking device in no way interferes with the downward travel of the wedge-block.

In order to prevent the wedges from slipping and the fish-plates from becoming loose through the breakage of a spring, gibs and cotters may be provided, which will always maintain the wedge or wedges at the highest point which they may have reached under pressure of the spring or springs.

It will be readily understood that the invention is capable of variations and modifications in the details of construction without interfering with the main principles upon which it is devised. Three of these modifications are shown and hereinafter described and sufficiently indicate the manner of carrying into effect the principles indicated.

Figure 2:
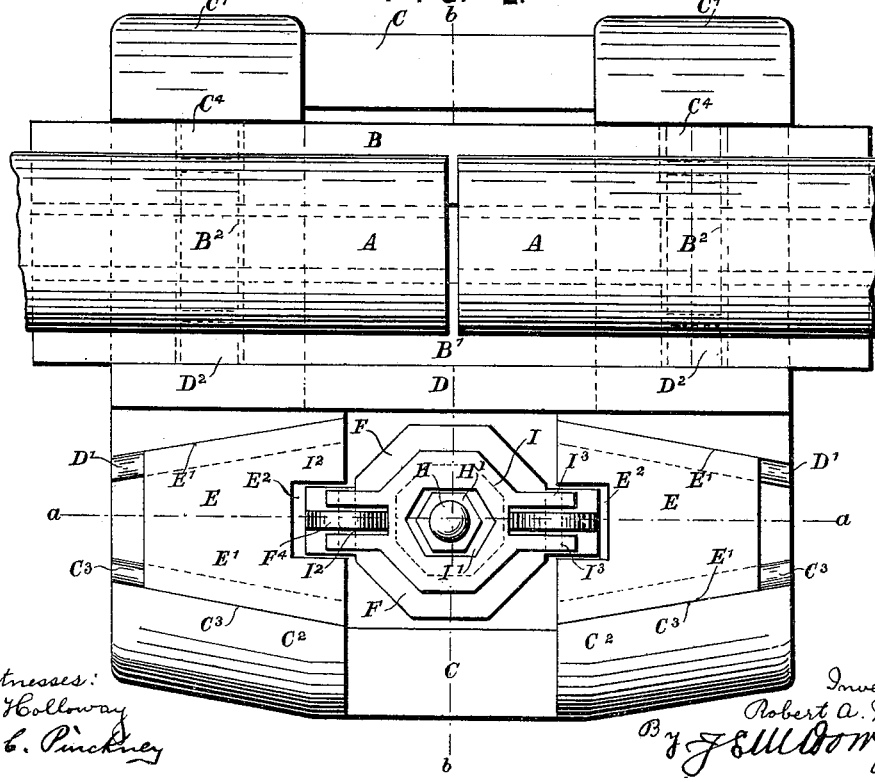
Figure 3:
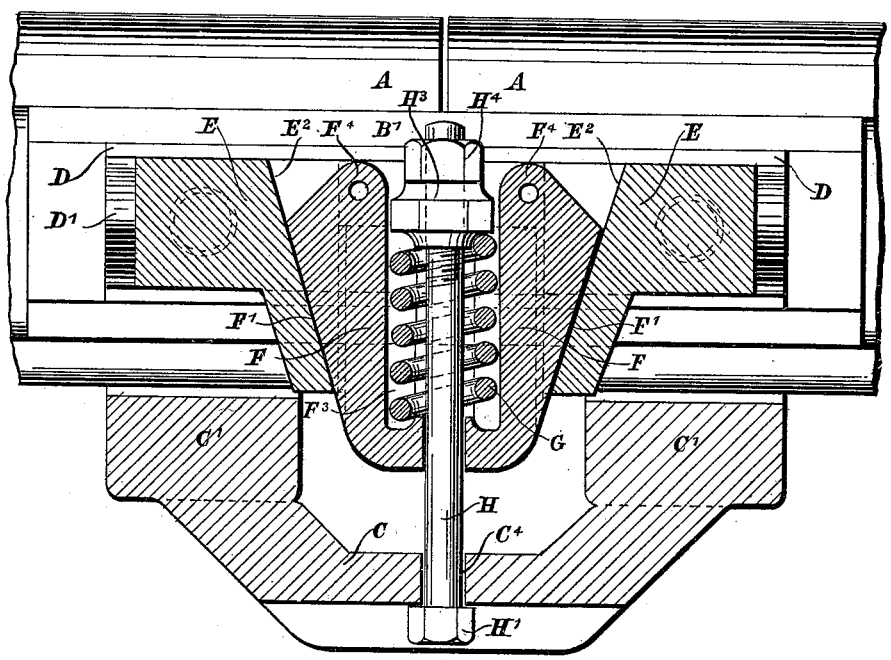
Figure 4:
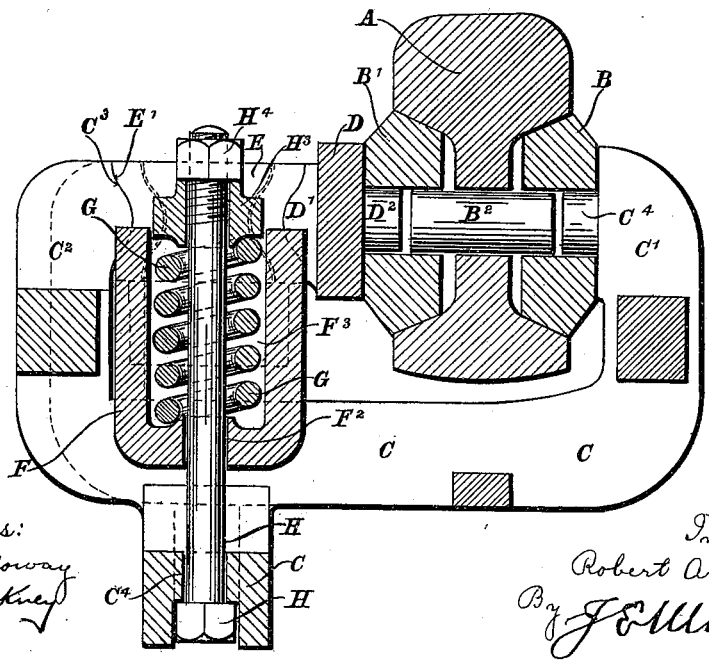
Figure 7:
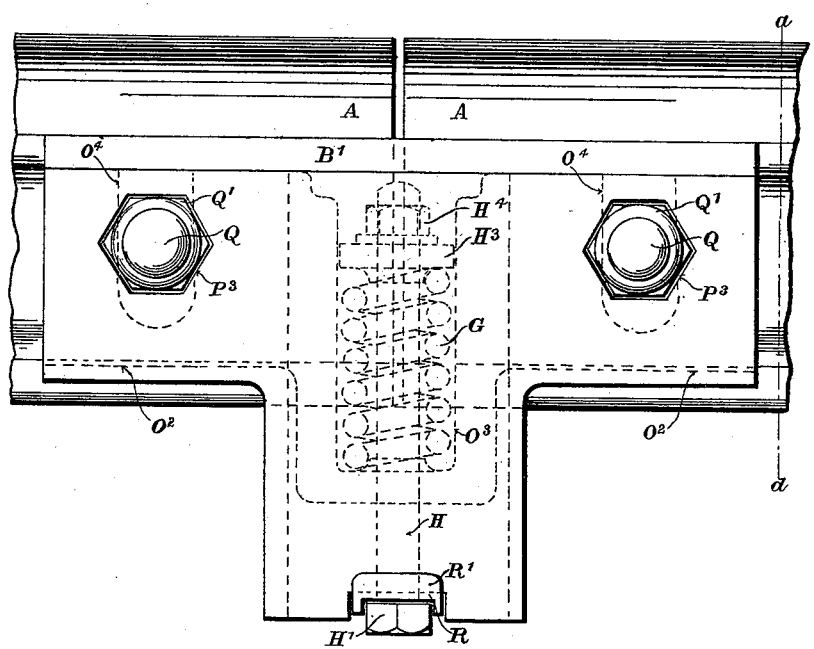
Figure 8:
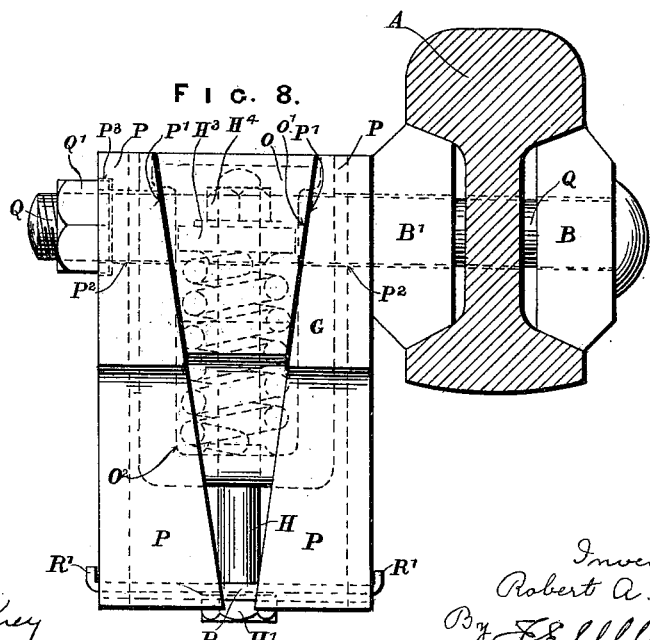
Figure 9:
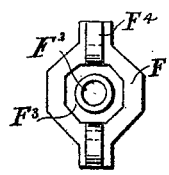
Figure 10:
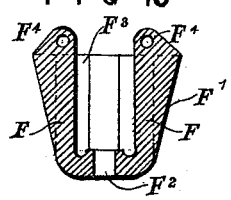
Figure 11:
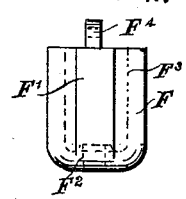
Figure 12:
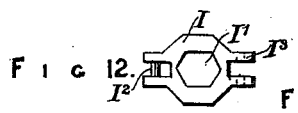
Figure 13:
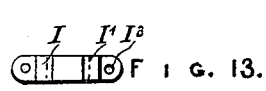
Figure 14:
Figure 15:
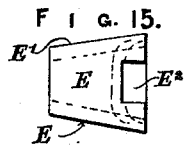
Figure 16:
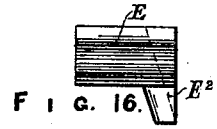
Figure 17:
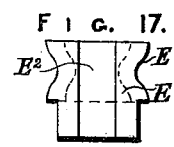
Figure 18:
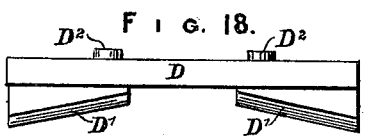
Figure 19:
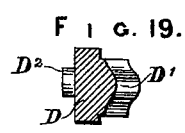
Figure 20:
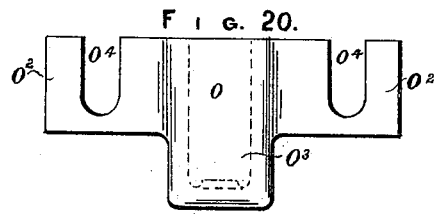
Figure 21:
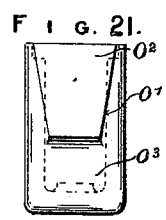
Figure 22:
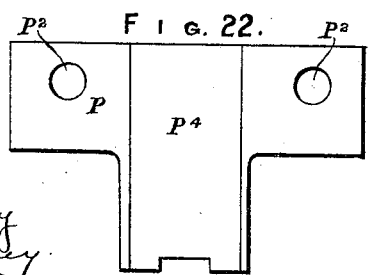
Figure 23:
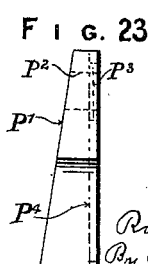

Referring to the accompanying drawings, Figure 1 is a side elevation of the invention, in which a vertical wedge-block is arranged to operate horizontal wedges traveling upon corresponding horizontal inclined planes formed on a wedge-plate and in a clamp device which is so arranged as to pass under the rails, maintaining the fish-plates as at present in use in contact with the rails; Fig. 2, a plan of the same; Fig. 3, a longitudinal sectional elevation of the same along the line *a a* in Fig. 2; Fig. 4, a transverse sectional elevation of the same upon line *b b* in Fig. 2; Fig. 5, a plan of a modification of the same, in which a vertical wedge-block travels upon corresponding vertical inclined planes formed upon two wedge-plates, one of which wedge-plates engages the inner fish-plate and the other a clamp, which is so arranged as to pass under the rail and to take a bearing against the outer fish-plate; Fig. 6, a transverse section of the same along a line *c c* in Fig. 5; Fig. 7, a longitudinal elevation of a further modification, in which the clamp passing under the rails is dispensed with and the wedge devices applied to suitable bolts and nuts for the same purpose, the internal parts being shown by dotted lines; Fig. 8, an end elevation of the same, the rail being shown in section on line $d$ $d$, Fig. 7, and the internal parts by dotted lines; Figs. 9, 10, and 11, a plan, longitudinal section, and end view of the vertical wedge-block used in Figs. 1, 2, 3, and 4; Figs. 12 and 13, a plan and side view of the locking device for the same; Fig. 14, a plan of the washer of the helical-spring compression-bolt; Figs. 15, 16, and 17, a detail plan, longitudinal elevation, and end view of horizontal wedge also for the same; Figs. 18 and 19, a plan and transverse section of horizontal wedge-plate used with the same; Figs. 20 and 21, a longitudinal elevation and end view of vertical wedge-shaped block used in connection with the modifications shown in Figs. 5, 6, 7, and 8. Figs. 22 and 23 are respectively inside and end views of vertical wedge-plate employed in Figs. 7 and 8.

Similar letters refer to similar parts where shown throughout the drawings.

The invention will first be described as applied to the fish-plates at present in use.

Referring to Figs. 1, 2, 3, and 4, the rails A A are engaged by fish-plates B B' in the ordinary way. To prevent creep or travel, they may both be drilled and provided with short bolts or dowels $B^2$. In order to maintain the fish-plates in intimate contact with the rails and to take up any looseness which may be occasioned by wear of the fish-plates, in place of the bolts and nuts at present in use a clamp C is provided having two upwardly-projecting lugs or jaws C', which engage the outer fish-plate B. The inner side of the clamp C is provided with lugs $C^2$, having internal horizontal inclined planes $C^3$ $C^3$. Corresponding inclined planes D' are formed upon the outer face of a supplementary wedge-plate D, Figs. 18 and 19, the inside face of which takes a bearing against the inner fish-plate B' and maintains it in close contact with the rails A A.

In order to maintain pressure upon the wedge-plate D, two horizontal wedges E E are provided, Figs. 15, 16, and 17, having inclined planes E' corresponding with the inclined planes $C^3$ and D'. To prevent the wedges E E from rising, the planes D' D', Fig. 19, and $C^3$ $C^3$ are preferably made with convex edges and the edges of the inclined planes E' E' of the wedges E E, formed concave, Fig. 17, to correspond with the same, or vice versa, or of any suitable shape to accomplish the same purpose. The wedges E E are actuated by a wedge-block F, Figs. 9, 10, and 11, having vertical inclined planes F' F' and traveling upon corresponding vertically-inclined planes $E^2$ $E^2$, Fig. 3, formed upon the inner ends of the horizontal wedges E E. Pressure is maintained upon the wedge-block F by the tension of a helical spring G, Figs. 3 and 4, compressed by means of a screw-bolt H. The head H' of the screw-bolt H takes a bearing underneath the clamp C, the body of the same passing through a hole $C^4$ provided for the purpose, and thence through a hole $F^2$ in the bottom of the wedge-block F and through the center of the helical spring G. The wedge-block is formed with an internal recess $F^3$, in which the helical spring G is contained and against the bottom of which the lower end of the spring takes a bearing. The recess $F^3$ is preferably octagonal or other suitable shape, which will prevent from turning a washer $H^3$, Fig. 14, of similar shape placed upon the top of the helical spring G and acted upon by the screw-nut $H^4$ of the bolt H. By this means the helical spring G during compression is prevented from turning and uniform pressure imparted to it.

In practice, the several parts having been placed in position, pressure is imparted to the helical spring G by the screw-nut $H^4$. The effect of this is to force down the wedge-block F along the inclined planes $E^2$ $E^2$ and to force outward the wedges E E along the inclined planes $C^3$ $C^3$ and D' D', bringing the wedge-plate D in close contact with the inner fish-plate B' and at the same time by forcing outward the clamp C imparting pressure by means of the clamp-jaws C' C' upon the outer fish-plate B. The wedge-block F having been forced down to its fullest extent and the helical spring G still farther compressed, should from wear or other cause the fish-plates have a tendency to become loose or in any way the intimate pressure upon the rails be relaxed the expansion of the helical spring G will automatically farther force down the wedge-block F, and by pressing outward the wedges E E automatically take up such slackness and maintain the intimate pressure of the fish-plates B B' upon the rails A A.

In order to prevent the screw-nut $H^4$ from shaking loose or turning upon the screw-thread, a hinged locking-piece I is provided, Figs. 12 and 13, having an opening I', corresponding with the shape of the screw-nut $H^4$. The locking-piece I is hinged at $I^2$ to the head $F^4$ of the wedge-block F and when in position is secured by its projecting jaws $I^3$ and a split pin or other suitable means to the head $F^4$ upon the block F. By this means it is impossible for the screw-nut $H^4$ to turn until the locking device I is released. While preventing the screw-nut $H^4$ from turning, the opening I' should be sufficiently large to allow of its passing freely through and thereby in no way interfering with the movement of the wedge-block F.

In order to prevent longitudinal movement of the fish-plates between the clamp and wedge-plate, two holes are drilled in each fish-plate, and the inner face of the clamp-jaws C' C' and the inner face of the wedge-plate D are constructed with corresponding studs $C^4$ $D^2$, engaging the same. These studs $C^4$ and $D^2$ may extend about half the thickness of the fish-plate, as shown more particularly in Fig. 4, leaving room for the pins or dowels $B^2$ $B^2$, which pass through the rails A A and engage both fish-plates B B'.

When it is not desired to make use of the shallow fish-plates as at present in use, the wedge-plate D may be dispensed with and a special form of fish-plate provided, having the inclined planes D' D' formed upon the outer face of the inner fish-plate itself in a similar manner to that shown in Fig. 18. The wedges may also by a further arrangement of parts be given an inward travel, while accomplishing the same purpose.

In place of the wedge-block and horizontal wedges, as in Figs. 1, 2, 3, and 4, a wedge-block and wedges having vertically-inclined planes may be provided, the whole being cast in one piece, as shown in Figs. 5 and 6 and in detail in Figs. 20 and 21.

In place of being itself constructed with the inclined planes the inner face of the clamp C is in this case provided with a wedge-plate L, having vertically-inclined planes L', Figs. 5 and 6. The wedge-plate L is provided with holes $L^2 L^2$, which engage studs $C^5 C^5$, formed upon the inner face of the clamp-jaws $C^2$. A corresponding wedge-plate N, having internal vertical inclined planes N' N', engages the inner fish-plate B' and is held in position upon it by projecting studs $N^2 N^2$, formed upon its outer face and engaging corresponding holes provided in the fish-plate B'. In order to maintain pressure upon the wedge-plates L and N, a wedge-block O is provided, Figs. 20 and 21, having projecting wedge-shaped lugs $O^2$, provided with vertically-inclined planes O', corresponding with the vertically-inclined planes L' N'. The body of the wedge-block O is constructed with a central recess $O^3$, in which is placed a helical spring G, compressed in the manner before described. The action of the helical spring upon the internal portion of the wedge-block O is the same as that described in connection with the wedge-block F in Figs. 1, 2, 3, and 4, to which the same letters of reference apply. By this means the tension of the helical spring acting through the wedge-block O and the lugs $O^2$ upon the inclines L' and N' of the wedge-plates L and N maintains a constant pressure upon the fish-plates B B'.

If it is desired to dispense with the clamp C, the invention may, as a further modification, be applied to the bolt-and-nut method by which the fish-plates are at present held in position. This is accomplished as shown more particularly in Figs. 7 and 8. In this modification the same wedge-block is employed as shown in the method illustrated in Figs. 5 and 6 and in detail in Figs. 20 and 21. The wedge-plates P P, however, differ in shape from those previously employed and are as shown in detail in Figs. 22 and 23, being constructed with wings having inclined planes. Each of the wings of the wedge-plates P P is provided with an internal vertically-inclined plane P', corresponding with the inclined planes O' of the lugs $O^2$ of the wedge-block O. The lugs $O^2$ of the wedge-block O are provided with slots $O^4 O^4$, Fig. 20, so as to allow of the up-and-down movement upon the screw-bolts Q. The wings of the wedge-plates P are provided with suitable openings $P^2 P^2$, through which the bolts Q pass, those in the outer plate being recessed, as at $P^3$, in order to receive the screw-nuts Q'. The wedge-plates P are constructed with an internal central recess $P^4$, adapted to receive the body of the wedge-block O and to allow of its moving freely up and down as required. The center parts of the wedge-plates P are joined at their lower extremities by a loose flange-piece R, the two ends of which, R', are turned upward to engage the wedge-plates P, while the edges are turned downward in order to form a recess for receiving the head H' of the pressure screw-bolt H.

In practice the nuts Q' are screwed up upon the bolt Q, the wedge-block O being pushed up to its highest point until the sides of the nuts Q' coincide with the sides of the recesses $P^3$. The wedge-block O is now depressed and forces the nuts Q' into the recesses $P^3$, whereby they are effectually locked. The spring G is then placed in the recess $O^2$ and pressure imparted to the same by the nut $H^4$ upon the bolt H. The tension of the spring G acting through the block O upon the wedge-plates P forces these apart and maintains the fish-plates in close contact with the rails.

Though described with wedge-blocks having inclined planes upon both sides, these may be constructed with inclines upon one side only, in which case a corresponding wedge-plate would be used upon that side and a flat plate or the fish-plate itself upon the other.

Having now particularly described and ascertained the nature of my said invention and in what manner the same is to be performed, I declare that what I claim is—

1. The combination of rails end to end, fish-plates in close contact with opposite sides of the rails, and a spring-pressed wedge arranged to press both fish-plates against said rails.

2. The combination of rails end to end, fish-plates in close contact with opposite sides of said rails, a clamp device, one or more wedges coöperating with the clamp to press the fish-plates against the rails, and a spring or springs operating said wedge or wedges.

3. In rail-fastenings a clamp, the outer jaws of which take a bearing against the outer fish-plate, and the inner jaws of which are provided with internal inclined planes operated upon by a movable wedge or wedges actuated by the tension of a compressed spring.

4. In rail-fastenings, a clamp having the outer jaws engaging the outer fish-plate and inner jaws provided with inclined planes, and a wedge-plate having similar inclined planes engaging the inner fish-plate, both operated upon by a movable wedge or wedges actuated by the tension of a compressed spring.

5. In rail-fastenings a wedge-block operated upon by the tension of a compressed spring and itself operating movable wedges, substantially as described.

6. In rail-fastenings a clamp having inclined planes, a wedge-plate, and wedges operated by a wedge-block actuated by the tension of a compressed spring, as a combination of parts, substantially as described.

7. The combination of rails meeting end to end, inner and outer fish-plates, an inclined face or plane operatively connected with one of said fish-plates, a wedge operating on said inclined plane, and a spring pressing said wedge forward.

8. In rail-fastenings, an inner wedge-plate for engaging the inner fish-plate having vertical inclined planes operated upon by a wedge-block and lugs having corresponding vertical inclined planes.

9. In rail-fastenings, a wedge-block having projecting lugs provided with vertical inclined planes operating wedge-plates having corresponding inclined planes.

10. In rail-fastenings in which screw bolts and nuts are employed for maintaining the fish-plates in contact with the rails, wedge-plates having inclined planes operated upon by a wedge-block having projecting lugs, actuated by the tension of a compressed spring substantially as described.

11. In rail-fastenings in which screw bolts and nuts are employed for retaining the fish-plates in contact with the rails, a wedge-block having wedge-shaped lugs, plates having inclined planes, a flanged piece for connecting the same, and a screw bolt and nut for compressing a helical spring, as a combination of parts, substantially as herein described.

12. In rail-fastenings, in which screw bolts and nuts are provided for maintaining the fish-plates in contact with the rails, wedge-plates having inclined planes, a coöperating spring-pressed wedge, and there being recesses for the reception of the screw-nuts, substantially as described.

13. The combination of rails end to end, fish-plates connecting said rails, a clamp-body, a wedge in the clamp-body and having a recess in the direction of its length, a spring therein adapted to push the wedge forward, and a coöperating wedge-surface between said wedge and one of the fish-plates.

14. The combination of rails end to end, fish-plates connecting said rails, a clamp-body extending under the rails and up on each side, a wedge in the clamp-body and having a recess in the direction of its length, a spring therein adapted to push the wedge forward, and a coöperating wedge-surface between said wedge and one of the fish-plates.

15. In rail-fastenings, the combination with a screw bolt and nut for compressing the spring, of an octagonal or other suitably-shaped washer corresponding with the internal recess of the wedge-block, substantially as herein described.

In testimony whereof I have hereunto set my hand in presence of two subscribing witnesses.

ROBERT ARCHIBALD WHITE.

Witnesses:
CHARLES STANLEY BURGESS,
CLEMENT ALFRED HACK.